United States Patent
Akashi

(10) Patent No.: US 11,481,996 B2
(45) Date of Patent: Oct. 25, 2022

(54) CALCULATION DEVICE, INFORMATION PROCESSING METHOD, AND STORAGE MEDIUM

(71) Applicant: NEC Corporation, Tokyo (JP)

(72) Inventor: Ryuichi Akashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/276,389

(22) PCT Filed: Sep. 20, 2018

(86) PCT No.: PCT/JP2018/034726
§ 371 (c)(1),
(2) Date: Mar. 15, 2021

(87) PCT Pub. No.: WO2020/059064
PCT Pub. Date: Mar. 26, 2020

(65) Prior Publication Data
US 2022/0036107 A1  Feb. 3, 2022

(51) Int. Cl.
*H04N 5/232* (2006.01)
*G06V 10/98* (2022.01)
(Continued)

(52) U.S. Cl.
CPC .............. *G06V 10/993* (2022.01); *G06T 7/50* (2017.01); *G06V 10/147* (2022.01); *G06V 20/52* (2022.01);
(Continued)

(58) Field of Classification Search
None
See application file for complete search history.

(56) References Cited

U.S. PATENT DOCUMENTS

2004/0036892 A1* 2/2004 Ito ..................... H04N 1/3875
358/1.9
2012/0044352 A1* 2/2012 Aimura ................ G08G 1/166
348/148
(Continued)

FOREIGN PATENT DOCUMENTS

JP    H11-312216 A    11/1999
JP    2006-221467 A    8/2006
(Continued)

OTHER PUBLICATIONS

International Search Report for PCT Application No. PCT/JP2018/034726, dated Nov. 27, 2018.
(Continued)

*Primary Examiner* — Eileen M Adams
(74) *Attorney, Agent, or Firm* — Sughrue Mion, PLLC

(57) ABSTRACT

A calculation device includes: an image input unit that receives, as an input, an image acquired by an image acquisition device that photographs a prescribed area; a visibility evaluation unit that calculates an evaluation value showing the visibility of a detection object in the image, on the basis of the contrast of the image and noise information showing the degree of noise included in the image; a calculation unit that calculates a maximum visually recognizable distance, which is the maximum distance from the image acquisition device to the detection object at which the detection object is visually recognized in the image, based on the evaluation value, a value set as the actual size of the detection object in the image, and the image angle of the image acquisition device; and an output unit that generates and outputs output information based on the maximum visually recognizable distance.

18 Claims, 14 Drawing Sheets

(51) Int. Cl.
*G06T 7/50* (2017.01)
*G06V 20/52* (2022.01)
*G06V 10/147* (2022.01)
*H04N 5/272* (2006.01)
*H04N 7/18* (2006.01)

(52) U.S. Cl.
CPC ..... *H04N 5/23296* (2013.01); *H04N 5/23299* (2018.08); *H04N 5/272* (2013.01); *H04N 7/183* (2013.01); *G06T 2207/30232* (2013.01)

(56) References Cited

U.S. PATENT DOCUMENTS

2015/0341542 A1\* 11/2015 Preston ............... G03B 13/20
  348/346
2016/0120402 A1\* 5/2016 Limon ............... A61B 3/0058
  351/239

FOREIGN PATENT DOCUMENTS

| | | |
|---|---|---|
| JP | 2009-090844 A | 4/2009 |
| JP | 2009-217115 A | 9/2009 |
| JP | 2009-239821 A | 10/2009 |
| JP | 2009-267627 A | 11/2009 |
| JP | 2013-038591 A | 2/2013 |
| JP | 2013-042386 A | 2/2013 |
| JP | 2015-050693 A | 3/2015 |
| JP | 2016-201611 A | 12/2016 |

OTHER PUBLICATIONS

English translation of Written opinion for PCT Application No. PCT/JP2018/034726, dated Nov. 27, 2018.

\* cited by examiner

Fig.2

| NOISE AMOUNT N | EVALUATION VALUE |
|---|---|
| $0 \leqq N < 10$ | $k_4 \times 1.0/C$ |
| $10 \leqq N < 20$ | $k_4 \times 1.1/C$ |
| $20 \leqq N < 30$ | $k_4 \times 1.3/C$ |
| $30 \leqq N < 40$ | $k_4 \times 1.6/C$ |
| $40 \leqq N < 50$ | $k_4 \times 2.0/C$ |
| $50 \leqq N < 60$ | $k_4 \times 2.7/C$ |
| ... | ... |

Fig.3

| NOISE AMOUNT N | CONTRAST VALUE C | | | |
|---|---|---|---|---|
| | $0 \leqq C < 0.1$ | $0.1 \leqq C < 0.2$ | $0.2 \leqq C < 0.3$ | ... |
| $0 \leqq N < 10$ | $k_5$ | $k_5/1.20$ | $k_5/1.50$ | ... |
| $10 \leqq N < 20$ | $k_5$ | $k_5/1.18$ | $k_5/1.40$ | ... |
| $20 \leqq N < 30$ | $k_5$ | $k_5/1.16$ | $k_5/1.30$ | ... |
| $30 \leqq N < 40$ | $k_5$ | $k_5/1.13$ | $k_5/1.20$ | ... |
| $40 \leqq N < 50$ | $k_5$ | $k_5/1.10$ | $k_5/1.10$ | ... |
| ... | ... | ... | ... | ... | ns
CALCULATION DEVICE, INFORMATION PROCESSING METHOD, AND STORAGE MEDIUM

This application is a National Stage Entry of PCT/JP2018/034726 filed on Sep. 20, 2018, the contents of all of which are incorporated herein by reference, in their entirety.

TECHNICAL FIELD

The present disclosure relates to a technology for obtaining information regarding a camera for capturing an object.

BACKGROUND ART

Monitoring cameras are widely used for the purpose of monitoring a state in a predetermined area and detecting an event occurring in the predetermined area. The monitoring cameras are favorably required to spatially observe the entire area to be monitored.

PTL 1 discloses an invention of a camera installation simulator program for simulating a capture range of a camera. A computer for executing the camera installation simulator program specifies a capture range captured by a camera and a blind range that becomes a blind spot by a wall or an obstacle and is not captured. Then, the computer performs processing of displaying, in an area corresponding to the capture range of a top view of a predetermined area, an area corresponding to the blind range and a portion other than the blind range in different manners.

PTLs 2, 3 and 4 disclose technologies partially relevant to the present disclosure.

PTL 2 discloses a poor visibility evaluation method of evaluating a state of visibility using "hard to see" as an index for evaluation, using a frequency distribution obtained by conversion of a digital image.

PTL 3 discloses a lighting device that controls a lighting means for lighting an area in front of a vehicle for every small area in consideration of visibility of a driver.

PTL 4 discloses a processing device that calculates a distance from an infrared camera to a monitoring area in a case where the width of a capture area coincides with an upper limit for displaying an object to be monitored with a minimum number of pixels or more. The processing device divides a monitoring image acquired by the infrared camera into an area capable of displaying the object to be monitored with the minimum number of pixels or more and the other area, generates a monitoring image in which the divided result can be visually recognized, and displays the monitoring image on a display screen.

CITATION LIST

Patent Literature

[PTL 1] JP 2009-239821 A
[PTL 2] JP 2006-221467 A
[PTL 3] JP 2009-090844 A
[PTL 4] JP 2009-267627 A

SUMMARY OF INVENTION

Technical Problem

The capture range calculated by the technology described in PTL 1 is a range in which objects are photographed, but is not a range in which an object to be detected is visually recognized. In other words, even when the object to be detected is present in the range determined as the capture range by the technology described in PTL 1, the object to be detected may not be able to be visually recognized in the case where the object to be detected is present at a position where the object to be detected is not captured with a sufficient resolution.

Determining an area where an image observer cannot visually recognize the object to be detected as the capture range becomes a problem in confirming the completeness of the capture range of the camera with respect to the monitoring area.

PTLs 2 to 4 refer to the visibility but do not disclose a configuration for outputting information regarding a capture range of a camera in which the object to be detected is visually recognized in the real world.

Furthermore, in implementing the method of calculating an angle of view or a distance for displaying the object to be monitored with the minimum number of pixels or more, which is disclosed in PTL 4, the minimum number of pixels required for visually recognizing the object to be monitored needs to be input to the processing device by an operator. If the operator does not know the minimum number of pixels required for visually recognizing the object to be monitored, the calculation method disclosed in PTL 4 cannot be implemented. Furthermore, since the minimum number of pixels required for visually recognizing the object to be monitored is not absolute invariant information, an incorrect result is obtained in a case where an incorrect value is input to the processing device as the minimum number of pixels.

One of the objects of the present disclosure is to provide a device, a method, a program, and the like provided for simply and accurately knowing a capture range that is a capture range of a monitoring camera and in which an object to be detected can be visually recognized.

Solution to Problem

A calculation device according to one aspect of the present disclosure includes: an image input unit that receives, as an input, a captured image acquired by an image acquisition device that captures a predetermined area; a visibility evaluation unit that calculates an evaluation value representing visibility of a given object to be detected in the captured image based on a contrast of the captured image and noise information indicating a degree of noise included in the captured image; a calculation unit that calculates a maximum visually recognizable distance in which the given object to be detected is visually recognized in the captured image, the maximum visually recognizable distance being an upper limit of a distance from the image acquisition device to the given object to be detected, based on the evaluation value, a value set as an actual size of the given object to be detected in the captured image, and an angle of view of the image acquisition device; and an output unit that generates output information based on the maximum visually recognizable distance and outputting the output information.

An information processing method according to one aspect of the present disclosure includes: receiving, as an input, a captured image acquired by an image acquisition device that captures a predetermined area; calculating an evaluation value representing visibility of a given object to be detected in the captured image based on a contrast of the captured image and noise information indicating a degree of noise included in the captured image; calculating a maximum visually recognizable distance in which the given object to be detected is visually recognized in the captured image, the maximum visually recognizable distance being an upper limit of distance from the image acquisition device to the given object to be detected, based on the evaluation value, a value set as an actual size of the given object to be detected in the captured image, and an angle of view of the image acquisition device; and generating output information based on the maximum visually recognizable distance and outputting the output information.

A program according to one aspect of the present disclosure causes a computer to execute: image input processing for receiving, as an input, a captured image acquired by an image acquisition device that captures a predetermined area; visibility evaluation processing for calculating an evaluation value representing visibility of a given object to be detected in the captured image based on a contrast of the captured image and noise information indicating a degree of noise included in the captured image; calculation processing for calculating a maximum visually recognizable distance in which the given object to be detected is visually recognized in the captured image, the maximum visually recognizable distance being an upper limit of distance from the image acquisition device to the given object to be detected, based on the evaluation value, a value set as an actual size of the given object to be detected in the captured image, and an angle of view of the image acquisition device; and output processing for generating output information based on the maximum visually recognizable distance and outputting the output information. The above-described program is stored in, for example, a non-volatile and computer-readable storage medium.

Advantageous Effects of Invention

According to the present disclosure, a capture range of a monitoring camera and in which an object to be detected is visually recognizable can be easily and accurately known.

BRIEF DESCRIPTION OF DRAWINGS

FIG. 2 is a table illustrating an example of a lookup table for deriving an evaluation value.

FIG. 3 is a table illustrating an example of a lookup table for deriving an evaluation value.

EXAMPLE EMBODIMENT

Hereinafter, example embodiments of the present disclosure will be described in detail with reference to the drawings.

<<First Example Embodiment>>

First, a first example embodiment of the present invention disclosure will be described.

<Configuration>

Figure 1:
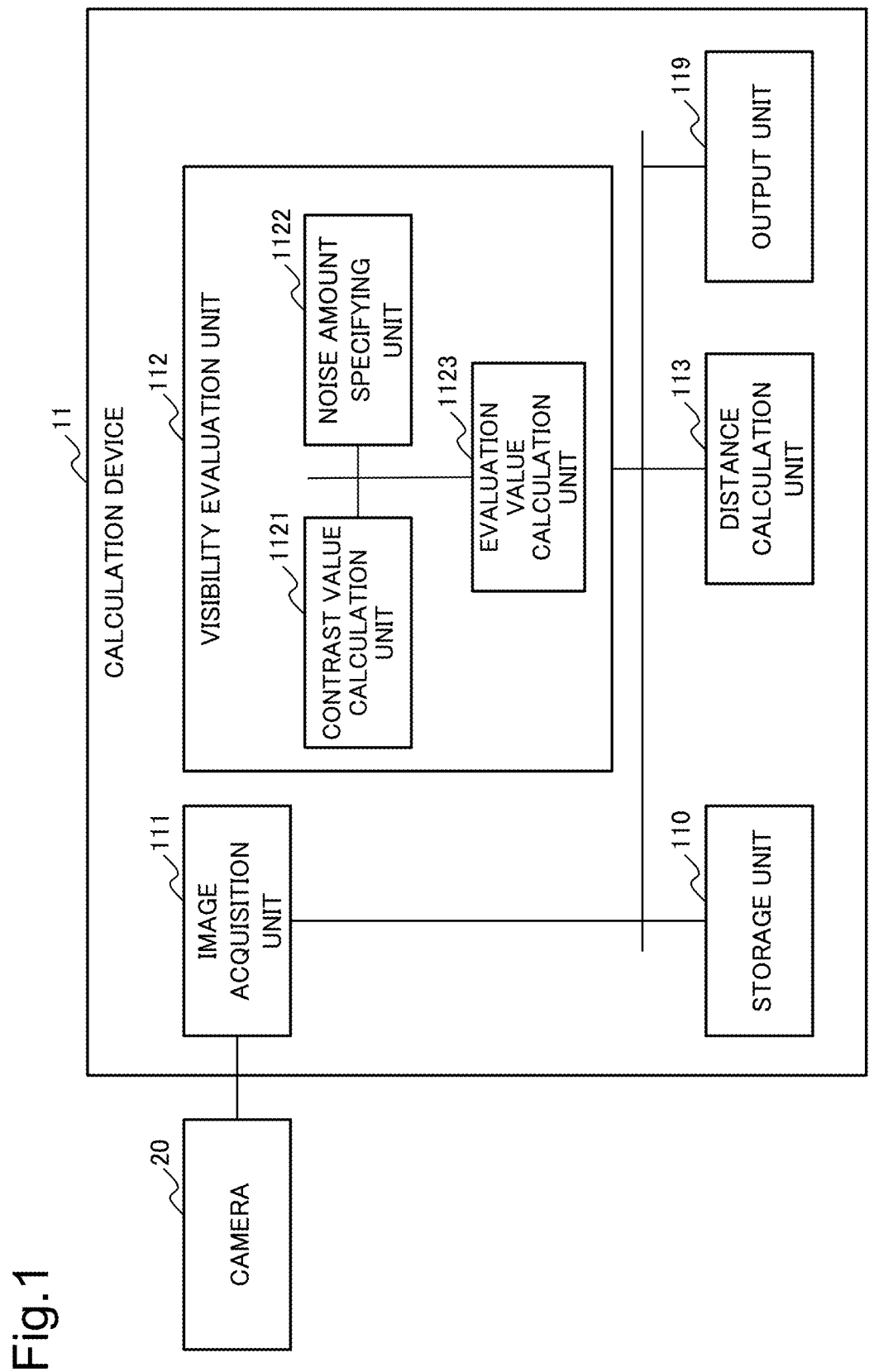
FIG. 1 is a block diagram illustrating a configuration of a calculation device according to a first example embodiment of the present disclosure.

FIG. 1 is a block diagram illustrating a configuration of a calculation device 11 according to the first example embodiment of the present invention.

The calculation device 11 is communicatively connected to a camera 20. The connection with the camera 20 may be wired connection or wireless connection.

The camera 20 is an imaging device. The camera 20 includes an imaging element such as a charge coupled device (CCD) or a complementary metal oxide semiconductor (CMOS) image sensor, for example. The camera 20 is not limited to a visible light camera and may be a near infrared camera, an infrared camera, or the like. The camera 20 captures an image of a predetermined area, thereby generating an image. Hereinafter, an image generated by imaging by the camera 20 is also referred to as a captured image. The captured image may be a color image or a grayscale image. The camera 20 may continue to generate captured images at a predetermined frame rate. The camera 20 transmits the generated captured image to the calculation device 11 as needed or in response to a request from the calculation device 11.

The camera 20 is used to obtain information regarding an object to be detected existing in a predetermined area. In the present disclosure, an object to be detected is an object (not limited to a tangible object and including, for example, a pattern or a symbol attached to an object) or a phenomenon that is detected according to a certain criterion. Examples of the object to be detected include an unspecified person, a person satisfying a specific condition, an unspecified organism, an organism satisfying a specific condition, an unspecified vehicle, an unspecified face, a face satisfying a specific condition, a number written on a license plate of a vehicle, an occurrence of a person satisfying a specific condition, an act satisfying a predetermined condition by a person appearing in an image, and a change satisfying a specific condition by an object appearing in an image.

Examples of the "person satisfying a specific condition" include a person registered in a database, a person not registered in a database, a person who takes an action defined as a suspicious action, a person having a characteristic (apparent height, apparent age, apparent sex, or the like) satisfying a predetermined criterion.

What is to be detected may vary depending on the purpose of use of the camera 20. In the following description, the object to be detected is assumed to be an unspecified person, for example. The unspecified person in an image can be detected by, for example, a method for detecting a person. There are known methods for a computer to detect a person.

As illustrated in FIG. 1, the calculation device 11 includes a storage unit 110, an image acquisition unit 111, a visibility evaluation unit 112, a distance calculation unit 113, and an output unit 119. The calculation device 11 may have an input interface for receiving an input of information from a user, in addition to the components illustrated in FIG. 1.

The lines connecting the components illustrated in FIG. 1 are exemplary lines for facilitating understanding of the flow of data. Each component is not necessarily required to be connected by a signal line similar to the lines illustrated in FIG. 1.

Each component in the calculation device 11 can make data available to other components when generating or acquiring the data. For example, each component can send the generated or acquired data to other components that use the data. Alternatively, each component may record the generated or acquired data in a storage area (for example, the storage unit 110, a memory (not illustrated), or the like) in the calculation device 11. Each component of the calculation device 11 may directly receive the data to be used from the component that has generated or acquired the data or may read the data from the storage area when executing processing.

Hereinafter, functions of the components in the calculation device 11 will be described. Each component in the calculation device 11 can be implemented by, for example, a computer including, for example, one or more processors that execute instructions based on a program and memories. A detailed example of the hardware will be described below.

===Storage Unit 110===

The storage unit 110 temporarily or non-temporarily stores data handled by the calculation device 11. The storage unit 110 can be implemented by, for example, a random access memory (RAM), a read only memory (ROM), a hard disk drive (HDD), a solid state drive (SSD), or a portable storage device. Other components included in the calculation device 11 can freely read and write data with respect to the storage unit 110.

===Image Acquisition Unit 111===

The image acquisition unit 111 acquires the image (that is, the captured image) generated by the camera 20 from the camera 20. Any data format can be adopted for the image acquired by the image acquisition unit 111. The image acquisition unit 111 may cause the storage unit 110 to store the acquired image. The image acquisition unit 111 may cause the output unit 119 to output the acquired image.

===Visibility Evaluation Unit 112===

The visibility evaluation unit 112 evaluates visibility. The term "visibility" in the present disclosure refers to easiness of visually recognizing the object to be detected in the image acquired by the image acquisition unit 111. Evaluating the visibility means deriving information representing evaluation of the visibility.

In the following description, the visibility evaluation unit 112 is assumed to derive a lower limit of a visually recognizable size of the object to be detected in the image as the information representing the evaluation of the visibility. The smaller the lower limit of the visually recognizable size of the object to be detected, the higher the visibility of the detection object.

In the present disclosure, "visually recognize" refers to "recognize the object from the image. For example, capable of detecting a specific object appearing in the image as the specific object may be defined as visually recognizing the specific object. Alternatively, capable of tracking the position of a specific object in a sequential image (that is, a video) may be defined as visually recognizing the specific object. A subject of a visual recognition action is, for example, an image analysis device for analyzing an image or a person who observes the image. The lower limit of the visually recognizable size is calculated as the information representing the evaluation (or "evaluation value") by an evaluation value calculation unit 1123 to be described below.

As illustrated in FIG. 1, the visibility evaluation unit 112 includes a contrast value calculation unit 1121, a noise amount specifying unit 1122, and the evaluation value calculation unit 1123. As will be described below, the evaluation value that is the information representing the evaluation is calculated by the evaluation value calculation unit 1123 based on a contrast value calculated by the contrast value calculation unit 1121 and a noise amount specified by the noise amount specifying unit 1122.

The contrast value calculation unit 1121 calculates the contrast value. The contrast value is a value serving as an index of the width of brightness in the image.

The contrast value calculation unit 1121 may calculate the contrast value based on the following formula, for example.

$$\text{The contrast value} = (I_{max} - I_{min})/(I_{max} + I_{min})$$

where $I_{max}$ represents the brightness of a pixel with the highest brightness and $I_{min}$ represents the brightness of a pixel with the lowest brightness.

In a case where the image is a grayscale image, a gradation value (a value in a range of 0 to 255, for example) may be adopted as the brightness. In a case where the image is a color image, the brightness can be calculated by integrating a plurality of gradation values representing the colors of a pixel. For example, when each pixel is represented by gradation values of R, G, and B, the contrast value calculation unit 1121 may calculate the brightness of the each pixel by integrating the gradation values. Specifically, when each gradation value (R, G, or B) is described as a value in the range of 0 to 255, the contrast value calculation unit 1121 may calculate the brightness of each pixel using, for example, a formula such as the brightness=$((R \times 299) + (G \times 587) + (B \times 114))/1000$.

As the value ($I_{max}$, $I_{min}$, or the like in the above example) used to calculate the contrast value, a pixel value of a pixel not reflecting noise is used to accurately calculate the evaluation value. In calculating the contrast value, preprocessing for reducing the influence of noise may be performed.

The method for calculating the contrast value is not limited to the above-described calculation method. Any calculation method for calculating the value serving as the index of the width of the brightness may be adopted. For example, the formula for calculating the contrast value may be $I_{max} - I_{min}$.

The noise amount specifying unit 1122 specifies the noise amount. The noise amount is information indicating the degree of noise in the image.

The noise amount specifying unit 1122 may specify the noise amount by performing noise amount estimation processing for the image acquired by the image acquisition unit 111.

A specific example of the noise amount estimation processing will be described below.

The noise amount estimation processing includes, as an example, the following steps:

(1) dividing the image into a plurality of blocks, and calculating a standard deviation of pixel values for each block; and (2) determining a sufficiently small value among the standard deviations calculated from the blocks as the noise amount.

The pixel value may be a value obtained by integrating color gradation values such as the brightness or may be a gradation value of a specific color.

Since a block having a sufficiently small standard deviation can be regarded as a block in which a captured object is flat, the block can be considered to be a block from which the degree of noise can be favorably detected. Therefore, the value determined by the above-described method can be said to be a value indicating the degree of noise in the image.

In other words, the estimation processing is processing of determining the standard deviation of the pixel values in an area where the luminance of the image is flat as the noise amount.

As the "sufficiently small value", for example, the minimum value of the standard deviations calculated from the blocks or an N-th value (N is a natural number to be set) from the smallest value may be defined.

The noise amount estimation processing is not limited to processing including the above steps.

Furthermore, the noise amount specifying unit 1122 may calculate the noise amount by a method other than the method for performing the noise amount estimation processing. For example, in a case where the camera 20 is provided with a sensor for measuring the degree of noise, the noise amount specifying unit 1122 may receive a measurement value by the sensor from the camera 20 and determine the measurement value as the noise amount. The camera 20 may have a function to calculate the noise amount, and the noise amount specifying unit 1122 may only receive the noise amount calculated by the camera 20.

The evaluation value calculation unit 1123 calculates the evaluation value of the visibility based on the contrast value calculated by the contrast value calculation unit 1121 and the noise amount specified by the noise amount specifying unit 1122. Specifically, the evaluation value calculation unit 1123 calculates, as the evaluation value, the lower limit of the visually recognizable size of the object to be detected in the image.

The size is a length in a predetermined direction. The size may be expressed by, for example, in the number of pixels.

An example of the method for calculating the evaluation value is described below.

The evaluation value calculation unit 1123 may calculate an evaluation value S by substituting the contrast value and the noise amount value in the following formula, for example.

[Math. 1]

$$S = k_1 \times e^{(k_2 \frac{N}{C} + k_3)} \quad (1)$$

where $k_1$, $k_2$, and $k_3$ are predetermined coefficients, N is a variable representing the noise amount, and C is a variable representing the contrast value.

As in the above formula, the evaluation value (that is, the lower limit of the visually recognizable size of the object to be detected in the image) depends on the noise amount and the contrast value. The larger the noise amount, the greater the evaluation value (that is, the object to be detected needs to be captured in a larger size). The higher the contrast value, the smaller the evaluation value (that is, the object to be detected is visually recognizable even if the object to be detected is small in size). The formula for calculating the evaluation value is not necessarily limited to the above formula, and the evaluation value calculation unit 1123 may calculate the evaluation value based on a formula indicating the relationship among the noise amount, the contrast value, and the evaluation value.

The above formula is derived based on the following knowledge.

It is assumed to be known that the lower limit of the visually recognizable size (the number of pixels in a direction) of the object to be detected is $S_0$ in an image with the noise amount of $N_0$ and the contrast value of $C_0$. When the contrast value changes from $C_0$ to $C_1$, $$N_c/N_0 = a \times (C_1/C_0) \quad (2)$$

approximately holds where $N_c$ is a noise amount in which the lower limit of the visually recognizable size of the object to be detected does not change, and a is a predetermined coefficient.

Furthermore, when the contrast value is unchanged and the size of the object to be detected is $S_1$, $$N_s/N_0 = b \times \ln(S_1/S_0) + d \quad (3)$$

approximately holds where the maximum value of the noise amount for enabling the object to be detected to be visually recognized is $N_s$, and b and d are predetermined coefficients.

When the contrast value of the image is C, the maximum value N' of the noise amount for enabling the object to be detected with the size of $S_0$ to be detectable satisfies:

$$N'/N_0 = a^*(C/C_0) \quad (4)$$

according to the formula (2). At this time, the relationship between N' and N satisfies:

$$N/N' = b \times \ln(S/S_0) + d \quad (5)$$

according to the formula (3), where the lower limit of the visually recognizable size of the object to be detected is S.

The relationship among the noise amount, the contrast value, and the evaluation value is derived as described in the formula (1) from the formulas (4) and (5).

The above-described various coefficients can be empirically determined.

In one aspect, the evaluation value calculation unit 1123 may derive the evaluation value of the visibility using a lookup table in which a set of the contrast value and the noise amount is associated with the evaluation value.

FIG. 2 is a diagram illustrating a first example of the lookup table. $k_4$ is a predetermined value. FIG. 3 is a diagram illustrating a second example of the lookup table. $k_5$ is a predetermined value. By using the lookup table as illustrated in FIG. 2 or 3, the evaluation value calculation unit 1123 can derive the evaluation value of the visibility, using the contrast value and the noise amount.

The evaluation value calculation unit 1123 may calculate the lower limit of the visually recognizable size in each of a plurality of directions. For example, the evaluation value calculation unit 1123 may calculate the lower limit of the vertical size of the captured image and the lower limit of the size in a lateral direction of the captured image.

===Distance Calculation Unit 113===

The distance calculation unit 113 calculates the maximum distance (hereinafter described as "maximum visually recognizable distance), from the image acquisition unit 111 to the object to be detected, in which the image observer can visually recognize the object to be detected from the captured image. The distance calculation unit 113 calculates the maximum visually recognizable distance using the visibility evaluated by the visibility evaluation unit 112, the size assumed as an actual size of the object to be detected, and an angle of view of the camera 20. Information of the angle of view of the camera 20 may be input in advance to the calculation device 11 and stored in the storage unit 110. For example, the calculation device 11 may acquire the information of the angle of view from the user via an input interface (not illustrated).

The size assumed as an actual size of the object to be detected is a value set according to the type of the object to be detected. The calculation device 11 may obtain specification of the size assumed as the actual size of the object to be detected from the user through an input interface (not illustrated). In a case where the object to be detected is defined in a manufacturing stage of the calculation device 11, a predetermined value may be set in advance as the size assumed as the actual size of the object to be detected. The set value may be stored in the storage unit 110, for example.

Hereinafter, a specific example of a method for calculating the maximum visually recognizable distance by the distance calculation unit 113 will be described, assuming that the information indicating the evaluation of the visibility generated by the visibility evaluation unit 112 is the lower limit of the number of visually recognizable pixels (in the vertical direction) of the object to be detected in the image.

The value of the lower limit is $S_V$. The distance calculation unit 113 can calculate the maximum visually recognizable distance ($D_V$) by, for example, the following formula.

$$D_V = P_V \times L_V / (2S_V \times \tan(\theta_V/2))$$

where $L_V$ is the size (in the vertical direction) assumed as the actual size of the object to be detected, $P_V$ is the number of pixels (in the vertical direction) of the image, and $\theta_V$ is the angle of view (in the vertical direction).

Figure 4:
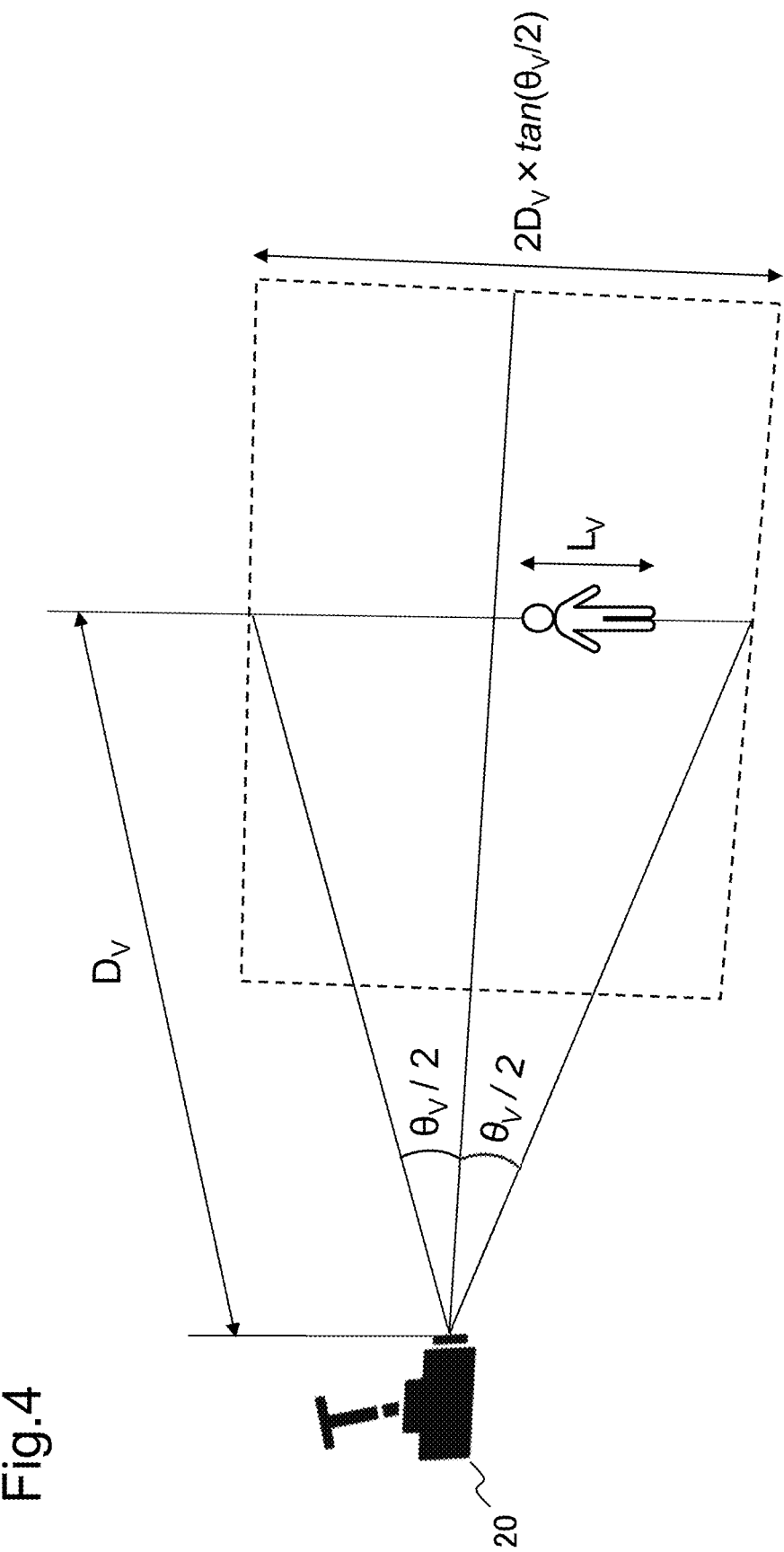
FIG. 4 is a diagram illustrating an example of a positional relationship between a camera and an object in a real space.
Figure 5:
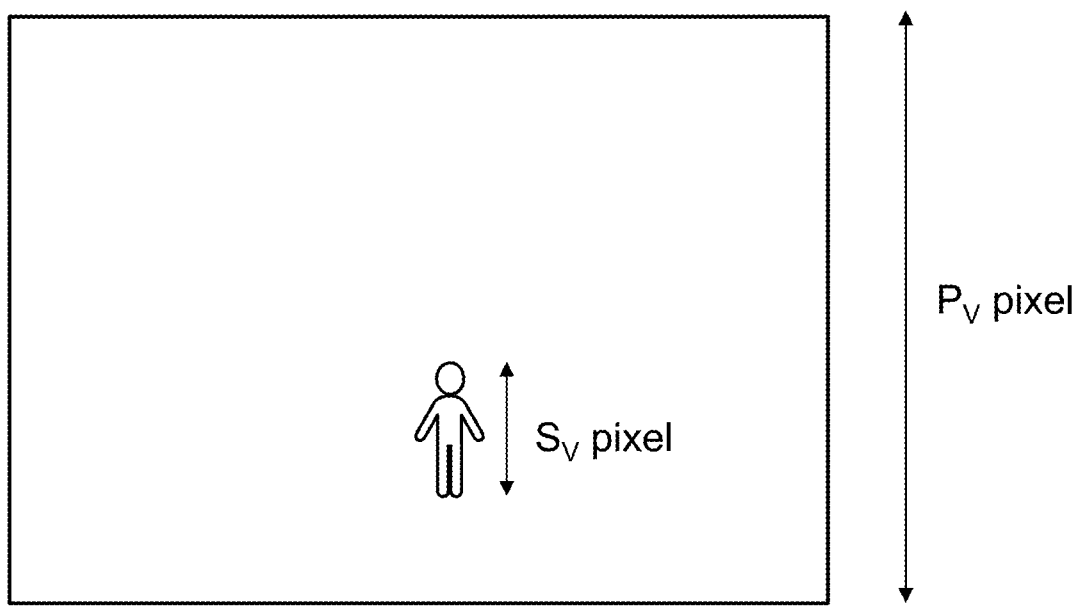
FIG. 5 is a diagram illustrating an example of a captured image.

The above formula is derived from the relationship among the parameters as illustrated in FIGS. 4 and 5. That is, since $D_V$ is a distance at which $2D_V \times \tan(\theta_V/2):L_V = P_V:S_V$ holds, the above formula is derived.

The distance calculation unit 113 may calculate the maximum value ($D_L$) of the distance at which the size in the lateral direction of the captured image becomes the visually recognizable size, as in the case of $D_V$. In calculating $D_L$, information to be used is a size $L_L$ (in the lateral direction) assumed as the actual size of the object to be detected, the number of pixels $P_L$ (in the lateral direction) of the image, and the angle of view $\theta_L$ (in the lateral direction) of the camera 20.

In the case of calculating the maximum visually recognizable distances in a plurality of directions, the distance calculation unit 113 may determine the smallest value among the plurality of calculated maximum visually recognizable distances as the maximum visually recognizable distance handled by the output unit 119.

===Output Unit 119===

The output unit 119 outputs information indicating a result of the processing by the calculation device 11. In other words, the information indicating a result of the processing is output information based on the maximum visually recognizable distance. The output unit 119 generates the output information based on the maximum visually recognizable distance and outputs the generated output information. A specific example of the output information will be described below.

For example, the output unit 119 may display the output information in a display device by outputting the output information to the display device.

The output unit 119 may transmit the output information to an information processing device other than the calculation device 11.

The output unit 119 may store the output information in a storage device by outputting the output information to the storage device. The storage device may be, for example, a non-temporary storage device such as an HDD or SSD, or a temporary storage device such as a RAM. When a person such as a user of the calculation device 11 accesses the information stored in the storage device, the person can get the result of the processing by the calculation device 11.

The followings are specific examples of the output information:

text data indicating the maximum visually recognizable distance;

table data associating identification information (for example, an identifier or an installation position) of the camera 20 and the maximum visually recognizable distance;

text data indicating whether the distance between the camera 20 and a predetermined position is within the maximum visually recognizable distance; and image data indicating the evaluation for the maximum visually recognizable distance.

The output unit 119 may be configured to perform processing for generating the above data. For example, the output unit 119 may associate the maximum visually recognizable distance with the identification information of the camera 20. The output unit 119 may determine whether the distance between the camera 20 and a predetermined position is within the maximum visually recognizable distance. The output unit 119 may evaluate the maximum visually recognizable distance <Operation>

Hereinafter, an example of a flow of the processing by the calculation device 11 will be described with reference to the flowchart in FIG. 6. In a case where each processing is executed by a processor that executes a program, the processing may be executed according to an order of instructions in the program. In a case where each processing is executed by an individual device, the processing may be executed in order when the device that has completed the processing notifies a device that executes the next processing. Each unit that performs processing may receive data necessary for the processing from a unit that has generated the data and/or read the data from a storage area (for example, the storage unit 110) included in the calculation device 11.

First, the image acquisition unit 111 acquires the captured image from the camera 20 (step S11).

Next, the visibility evaluation unit 112 evaluates the visibility using the acquired captured image. Specifically, the following processing is performed. The contrast value calculation unit 1121 calculates the contrast value of the captured image (step S12). The noise amount specifying unit 1122 calculates the noise amount of the captured image (step S13). The processing in step S12 and the processing in step S13 may be performed in parallel. Then, the evaluation value calculation unit 1123 calculates the evaluation value of the visibility based on the contrast value and the noise amount (step S14).

When the evaluation value of the visibility has been calculated, the distance calculation unit 113 calculates the maximum visually recognizable distance based on the evaluation value, a physical size of the object to be detected, the angle of view of an image acquisition device, and the number of pixels of the captured image (step S15).

Then, the output unit 119 outputs the output information based on the calculated maximum visually recognizable distance (step S16).

Effect

According to the calculation device 11 of the first example embodiment, the range in which the object to be detected is visually recognizable in the capture range of the camera 20 can be known. This is because the distance calculation unit 113 calculates the maximum value of the visually recognizable distance using the evaluation value of the visibility derived from the captured image generated by the camera 20. When the maximum value of the visually recognizable distance is known, the range in which the object to be detected is visually recognizable in the capture range of the camera 20 can be specified. That is, a range of points where the distance to the camera 20 does not exceed the maximum value in the capture range of the camera 20 is the range in which the object to be detected is visually recognizable.

Information of the range in which the object to be detected is visually recognizable is useful information when an observer who performs monitoring using the camera 20 determines the position, pose, and the like of the camera 20. For example, when the observer wants to install a plurality of cameras 20 in a predetermined area, the observer can examine arrangement of the plurality of cameras 20 in which the object to be detected can be visually recognized from anywhere in the predetermined area based on the information of the range in which the object to be detected is visually recognizable.

Modification

A modification of the first example embodiment will be described below.

Figure 7:
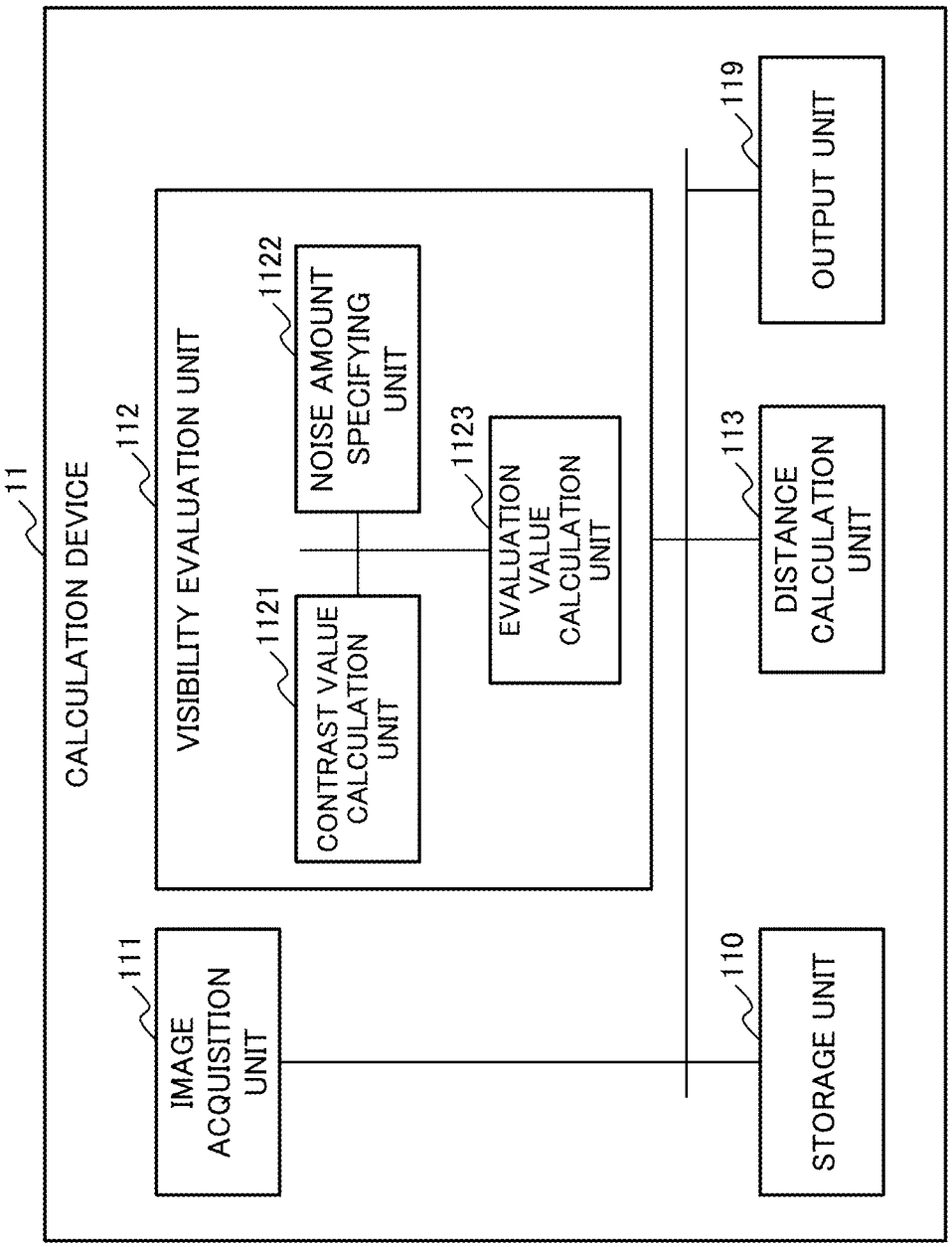
FIG. 7 is a block diagram illustrating a configuration of a modification of the calculation device according to the first example embodiment.

(1-1) The calculation device 11 may not be connected to the camera 20. FIG. 7 is a block diagram illustrating a configuration of the calculation device 11 not connected to the camera 20. The components in the calculation device 11 are the same as those of the calculation device 11 described above. The image acquisition unit 111 may acquire image data of the captured image by reading the image data from a storage medium that stores the captured image instead of acquiring the captured image from the camera 20, for example. The image acquisition unit 111 may receive the captured image from an external information processing device via a communication network.

(1-2) The image acquisition unit 111 may have the function of the camera 20. The calculation device 11 may generate the captured image using the image acquisition unit 111 in response to an instruction from the user, and then start the processing from step S12. The calculation device 11 may generate the captured image using the image acquisition unit 111 and store the captured image in the storage unit 110. Then, the calculation device 11 may read the captured image from the storage unit 110 in response to the instruction from the user and start the processing from step S12.

(1-3) The visibility evaluation unit 112 may acquire the contrast value from an outside instead of obtaining the contrast value by calculation from the image. The visibility evaluation unit 112 may acquire the information of the contrast value from the user of the calculation device 11 via an input interface (not illustrated).

(1-4) The visibility evaluation unit 112 may acquire the noise amount from an outside instead of obtaining the noise amount by calculation from the image. The visibility evaluation unit 112 may acquire the information of the noise amount from the user of the calculation device 11 via an input interface (not illustrated).

<<Second Example Embodiment>>

Next, a calculation device 12 according to a second example embodiment of the present disclosure will be described. The calculation device 12 specifies a range in which an object to be detected can be visually recognized in a capture range of a camera 20, and outputs output information based on the range.

<Configuration>

Figure 8:
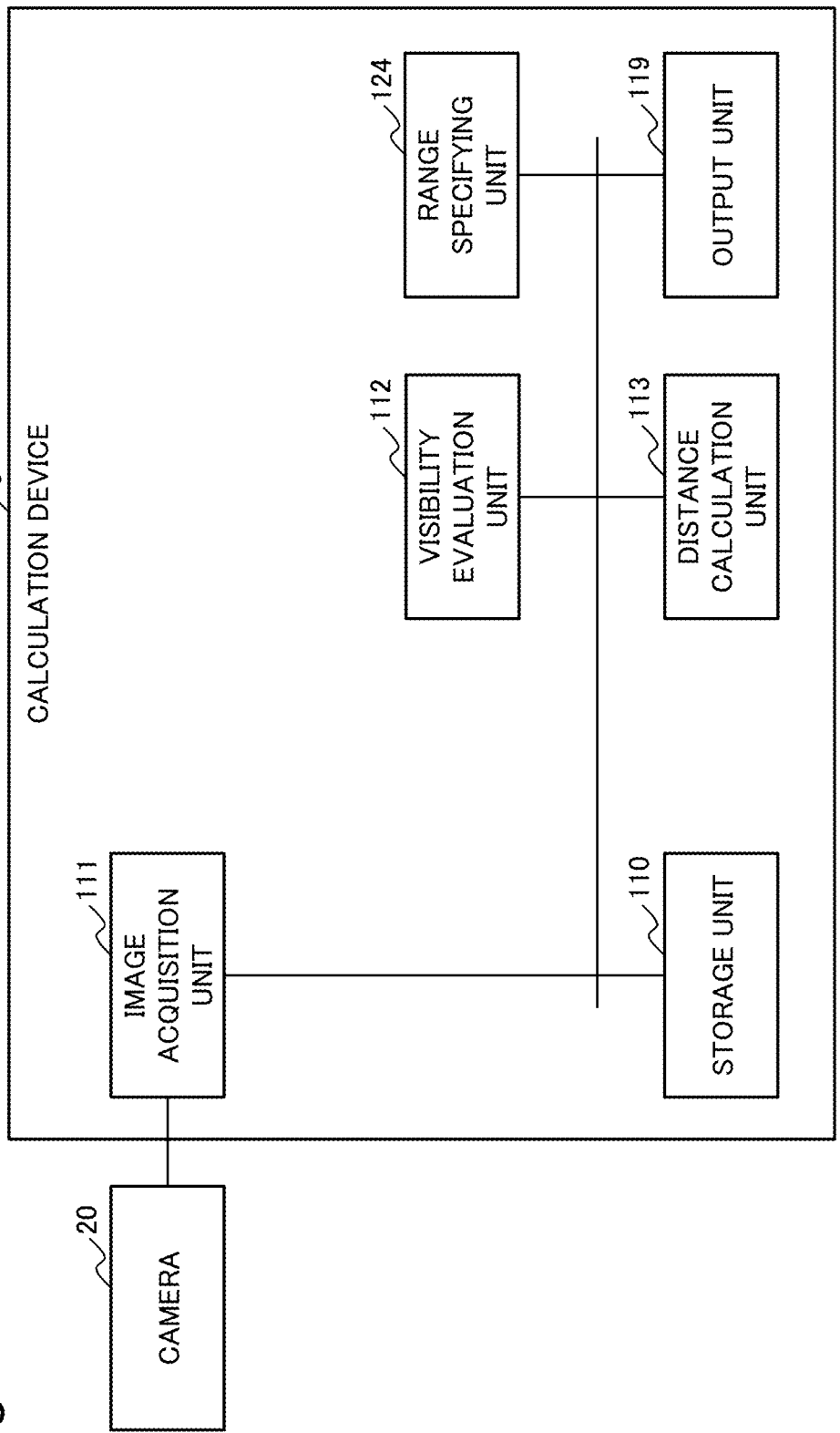
FIG. 8 is a block diagram illustrating a configuration of a calculation device according to a second example embodiment of the present disclosure.

FIG. 8 is a block diagram illustrating a configuration example of the calculation device 12. The calculation device 12 includes a range specifying unit 124 in addition to the same components as those of the calculation device 11 of the first example embodiment.

The components having the same reference numerals as those of the first example embodiment have the same functions as the corresponding components of the first example embodiment.

===Range Specifying Unit 124===

The range specifying unit 124 specifies the range in which an object to be detected can be visually recognized in the capture range of the camera 20, using a maximum visually recognizable distance calculated by a distance calculation unit 113. Hereinafter, the range in which an object to be detected can be visually recognized is described as visually recognizable range.

When the range specifying unit 124 specifies the visually recognizable range, the range specifying unit 124 uses the capture range of the camera 20 in addition to the maximum visually recognizable distance. Information of the capture range of the camera 20 may be stored in advance in a storage unit 110, for example, and read by the range specifying unit 124. Alternatively, the calculation device 12 may receive information for specifying the capture range of the camera 20 (for example, position coordinates and pose (that is, an optical axis direction and inclination) of the camera 20, an angle of view, three-dimensional structural information of an area (hereinafter, "object area") captured by the camera 20, and the like) as an input from an outside, and specify the capture range based on the information. The information for specifying the capture range of the camera 20 may be stored in advance in a storage area (for example, the storage unit 110) in the calculation device 12. In a case of calculating the capture range, the range specifying unit 124 may specify a non-blind area using information of an object (that is, a shield) existing in the object area. That is, the range specifying unit 124 may specify, as the capture range, an area excluding a blind area by the structure and the shield of the object area in an area (having a quadrangular shape) in the angle of view of the camera.

The range specifying unit 124 may determine, as the visually recognizable range, a portion where the capture range of the camera 20 and a spherical area in which the length of the radius around the position of the camera is the maximum visually recognizable distance overlap with each other.

The range specifying unit 124 may calculate the visually recognizable range by calculating the overlapping portion of the capture range and the spherical area based on the maximum visually recognizable distance after calculating the capture range. Alternatively, the range specifying unit 124 may calculate the visually recognizable range by specifying the spherical area based on the maximum visually recognizable distance after calculating the maximum visually recognizable distance and calculating the capture range in the spherical area.

The range specifying unit 124 may record the specified visually recognizable range in the storage unit 110. The specified visually recognizable range can be recorded by, for example, being associated with a flag indicating that an area within the visually recognizable range is within the visually recognizable range in data representing the three-dimensional structure of the object area. Alternatively, the visually recognizable range can be stored by describing the shape of the visually recognizable range in a data format describing a three-dimensional shape.

Alternatively, the visually recognizable range may be converted into a projection view on a specific plane of the specified visually recognizable range and recorded. The specific plane is, for example, the ground.

===Output Unit 119===

An output unit 119 generates output information based on the visually recognizable range as output information based on the maximum visually recognizable distance, and outputs the output information.

Figure 9:
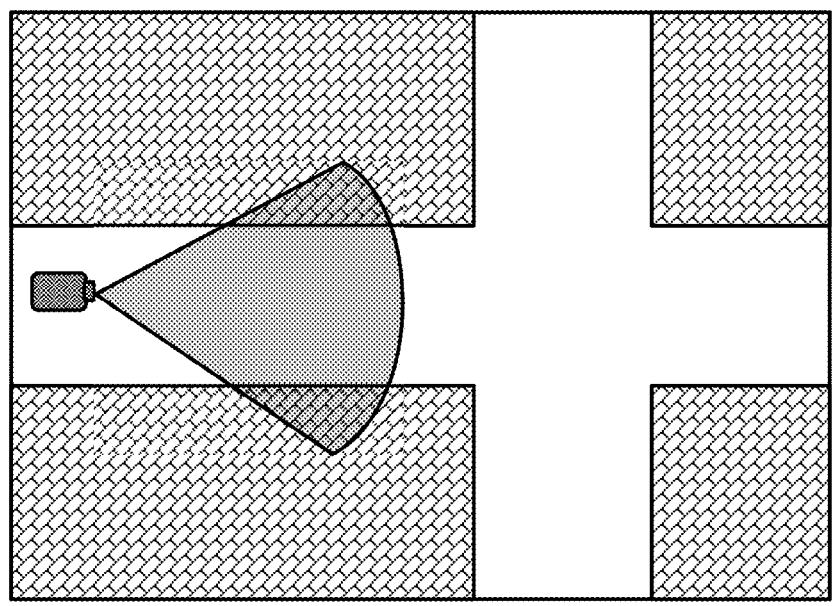
FIG. 9 is a diagram illustrating an example of output information based on a visually recognizable range.

The output information based on the visually recognizable range is, for example, an image given to identify the area in the visually recognizable range from the other area on a top view of the object area, for example. FIG. 9 is a diagram illustrating an example of such an image. In the example illustrated in FIG. 9, an icon representing the position of the camera 20 and a translucent graphic representing the visually recognizable range area (having a fan-shape in FIG. 9) are superimposed on the top view of the object area. The output unit 119 may generate such an image.

<Operation>

Figure 10:
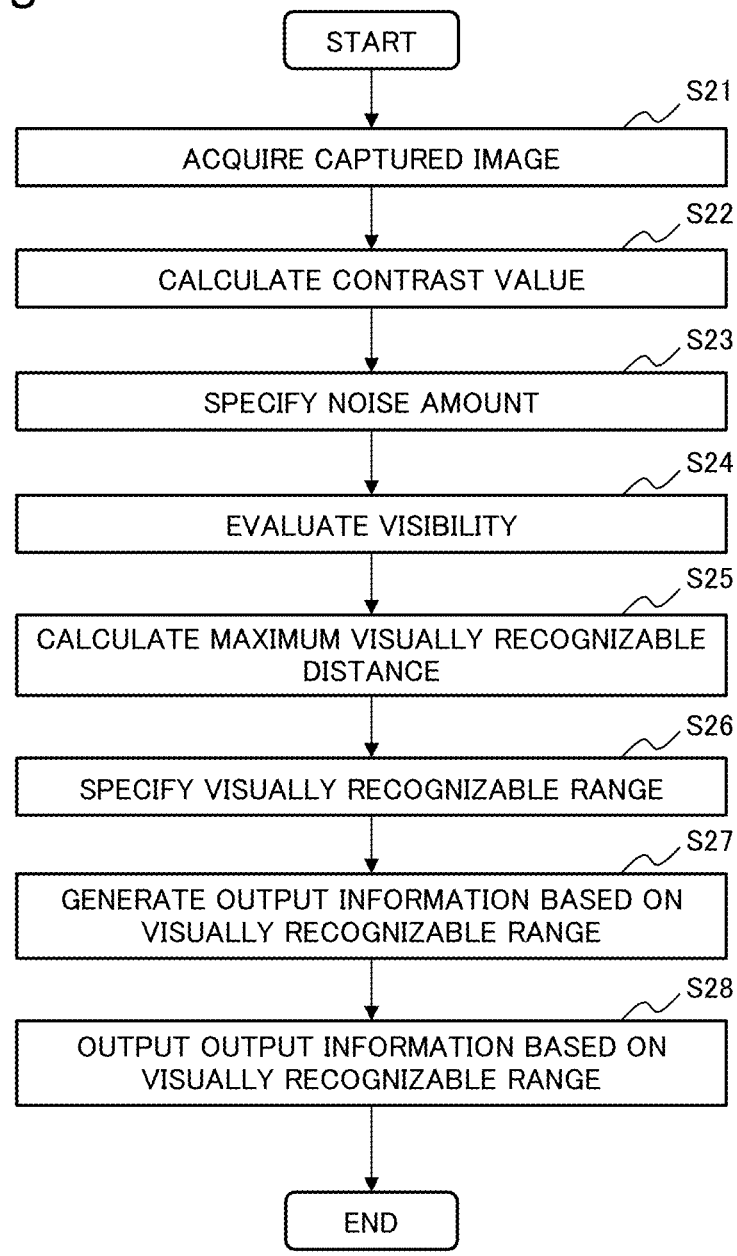
FIG. 10 is a flowchart illustrating an example of a flow of processing of the calculation device according to the second example embodiment.

An example of a flow of processing by the calculation device 12 will be described with reference to the flowchart in FIG. 10. Although a step for specifying or acquiring the information of the capture range of the camera 20 is not described in the flowchart in FIG. 10, timing to specify or acquire the information of the capture range of the camera 20 can be any timing.

Figure 6:
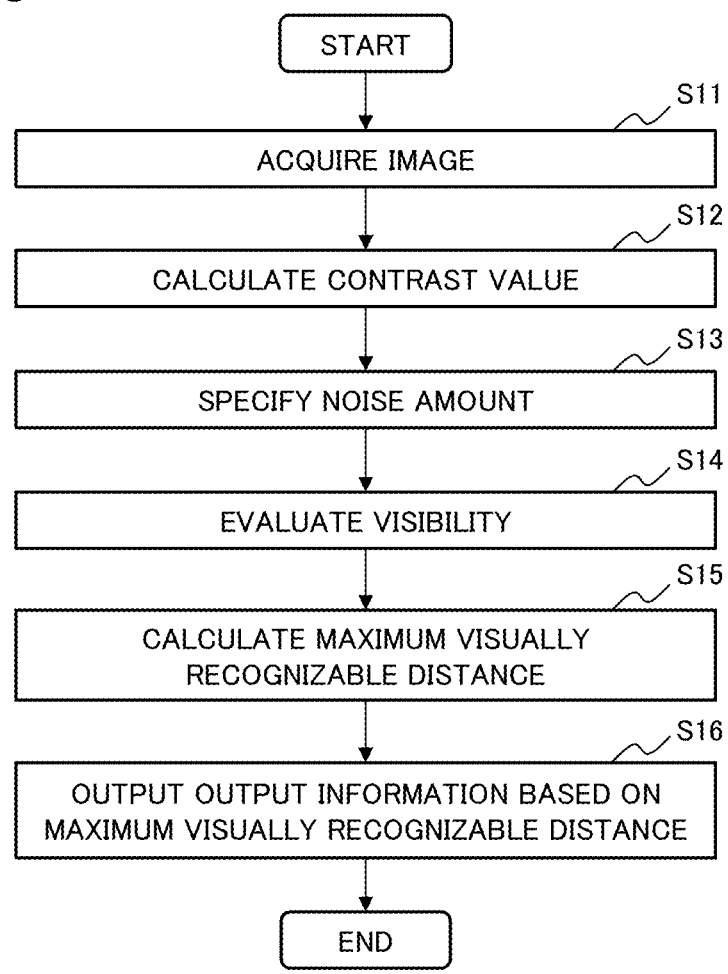
FIG. 6 is a flowchart illustrating an example of a flow of processing of the calculation device according to the first example embodiment.

The processing in steps S21 to S25 may be similar to the processing in steps S11 to S15 illustrated in FIG. 6.

In step S26, the range specifying unit 124 specifies the visually recognizable range, using the capture range of the camera 20 and the maximum visually recognizable distance.

Then, the output unit 119 generates the output information based on the visually recognizable range (step S27). The output unit 119 outputs the output information based on the visually recognizable range (step S28).

Effect

According to the calculation device 12 of the second example embodiment, the user of the calculation device 12 easily knows the range in which the object to be detected can be visually recognized in the capture range of the camera 20, that is, the visually recognizable range. This is because the range specifying unit 124 specifies the visually recognizable range, using the capture range of the camera 20 and the maximum visually recognizable distance, and the output unit 119 outputs the output information based on the visually recognizable range.

The user can intuitively understand the visually recognizable range in the case where the output information is an image in which the visually recognizable range is illustrated in a mode different from the area other than the visually recognizable range. If such output information is output, the user can easily examine an installation state of the camera 20.

Modification (2-1)

The output unit 119 may display the captured image in a display device.

Figure 11:
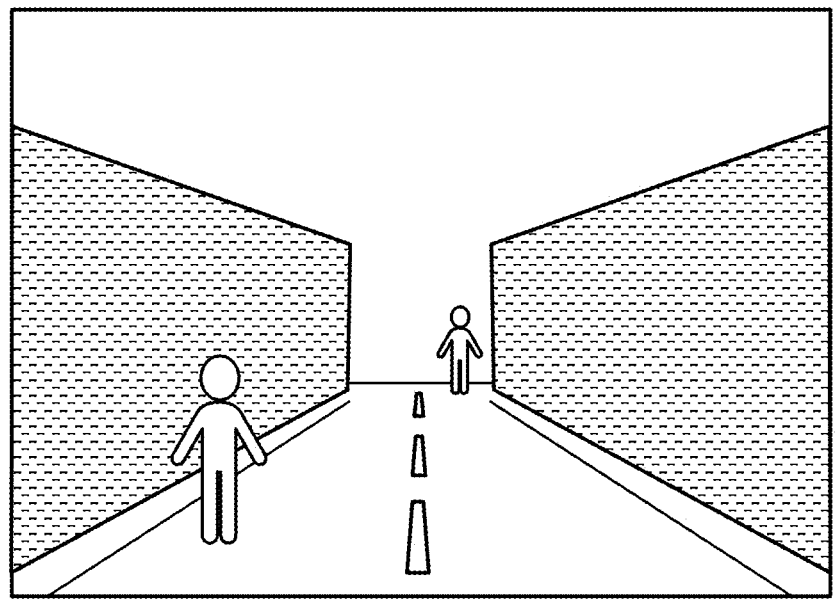
FIG. 11 is a diagram illustrating an example of a captured image.
Figure 12:
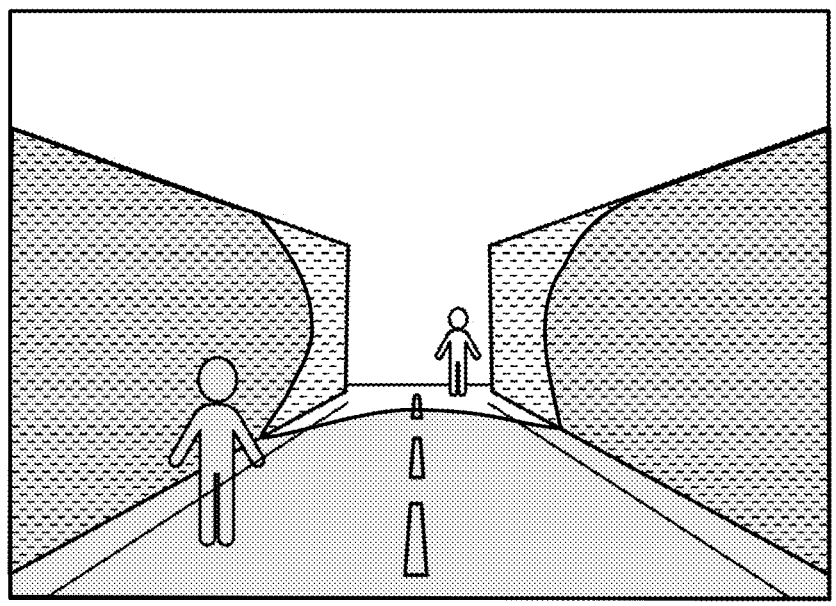
FIG. 12 is a diagram illustrating an example of a captured image in which information indicating the visually recognizable range is superimposed.

The output unit 119 may generate an image in which information indicating the visually recognizable range is superimposed on the captured image as the output information. FIG. 11 is a diagram illustrating an example of the captured image. FIG. 12 is a diagram illustrating an example of an image in which the information indicating the visually recognizable range (in this example, a solid color pattern with transparency) is superimposed on the captured image. In this manner, the output unit 119 may specify an area where a structure included in the capture range overlaps with the visually recognizable range in the captured image, and generate an image in which the specified area can be identified from the other area.

(2-2)

The calculation device 12 may be configured to send an instruction for changing at least either the pose (that is, the optical axis direction and inclination) of the camera 20 or the angle of view to the camera 20. For example, the calculation device 12 may send an instruction for changing the angle of view to the camera 20 in response to reception of an instruction for sending an instruction for changing the angle of view of the camera 20 to the camera 20 from the user. The camera 20 may be configured to change the angle of view according to the instruction upon receiving the instruction.

Further, the calculation device 12 may calculate the maximum visually recognizable distance and specify the visually recognizable range again in response to a change in either the pose or the angle of view of the camera 20. For example, the calculation device 12 may send an instruction for changing the angle of view to the camera 20, request the camera 20 to obtain a captured image after the changed angle of view, and obtain the captured image from the camera 20. The calculation device 12 may perform the processing from step S22 based on the captured image to derive the maximum visually recognizable distance and the visually recognizable range based on the changed angle of view.

(2-3)

In the case of generating the projection view on the specific plane of the specified visually recognizable range, the specific plane may be determined according to the object to be detected. For example, in a case where the object to be detected is an adult face, the object to be detected is assumed to be located away from the ground. In such a case, a plane 1.4 meters away from the ground may be set as the specific plane described above. The value of "1.4 meters" or the like may be specified by receiving an input from the user of the calculation device 12.

By setting the plane away from the ground as the specific plane, the area in which the object to be detected is visually recognizable can be more accurately calculated than the case of setting the ground as the specific plane.

<<Third Example Embodiment>>

A calculation device 10 according to an example embodiment of the present disclosure will be described.

Figure 13:
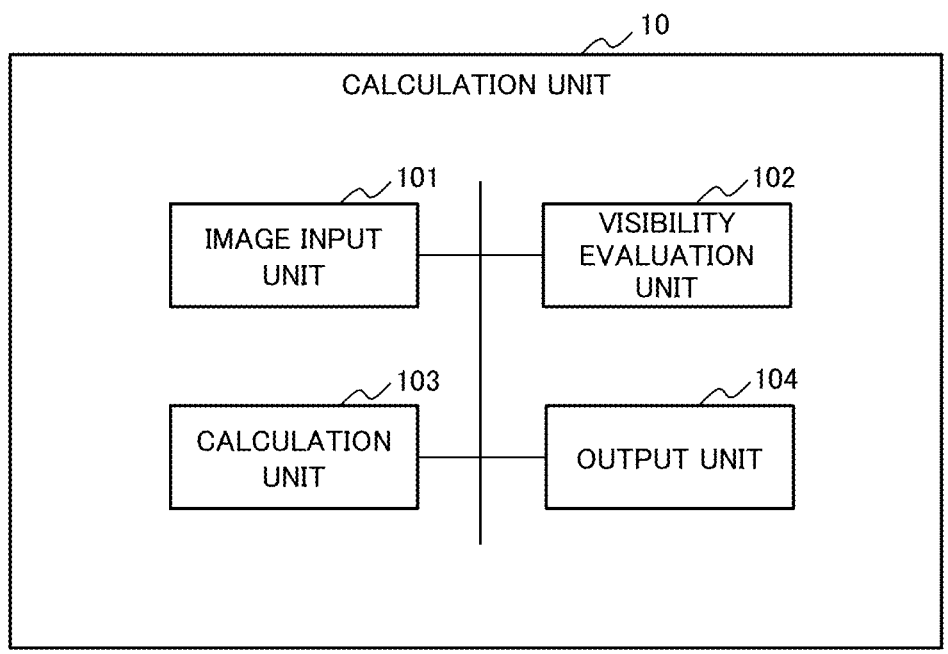
FIG. 13 is a block diagram illustrating a configuration of a calculation device according to an example embodiment of the present disclosure.

FIG. 13 is a block diagram illustrating a configuration of the calculation device 10. The calculation device 10 includes an image input unit 101, a visibility evaluation unit 102, a calculation unit 103, and an output unit 104.

The image input unit 101 receives a captured image acquired by an image acquisition device for capturing a predetermined area as an input.

The camera 20 in each of the above example embodiments is an example of the image acquisition device. The image acquisition unit 111 in each of the above example embodiments is an example of the image input unit 101.

The visibility evaluation unit 102 calculates an evaluation value indicating visibility of a given object to be detected in the captured image based on contrast of the captured image received by the image input unit 101 and noise information indicating the degree of noise included in the captured image.

The visibility evaluation unit 112 in each of the above example embodiments is an example of the visibility evaluation unit 102.

The calculation unit 103 calculates a maximum visually recognizable distance based on the evaluation value calculated by the visibility evaluation unit 102, a value set as a real size of the given object to be detected in the captured image, and an angle of view of the image acquisition device. The maximum visually recognizable distance is, as described above, an upper limit of the distance from the image acquisition device to the given object to be detected, in which the given object to be detected is visually recognized in the captured image. The distance calculation unit 113 in each of the above example embodiments is an example of the calculation unit 103.

The output unit 104 generates output information based on the maximum visually recognizable distance calculated by the calculation unit 103, and outputs the output information. The output unit 119 in each of the above example embodiments is an example of the output unit 104.

Figure 14:
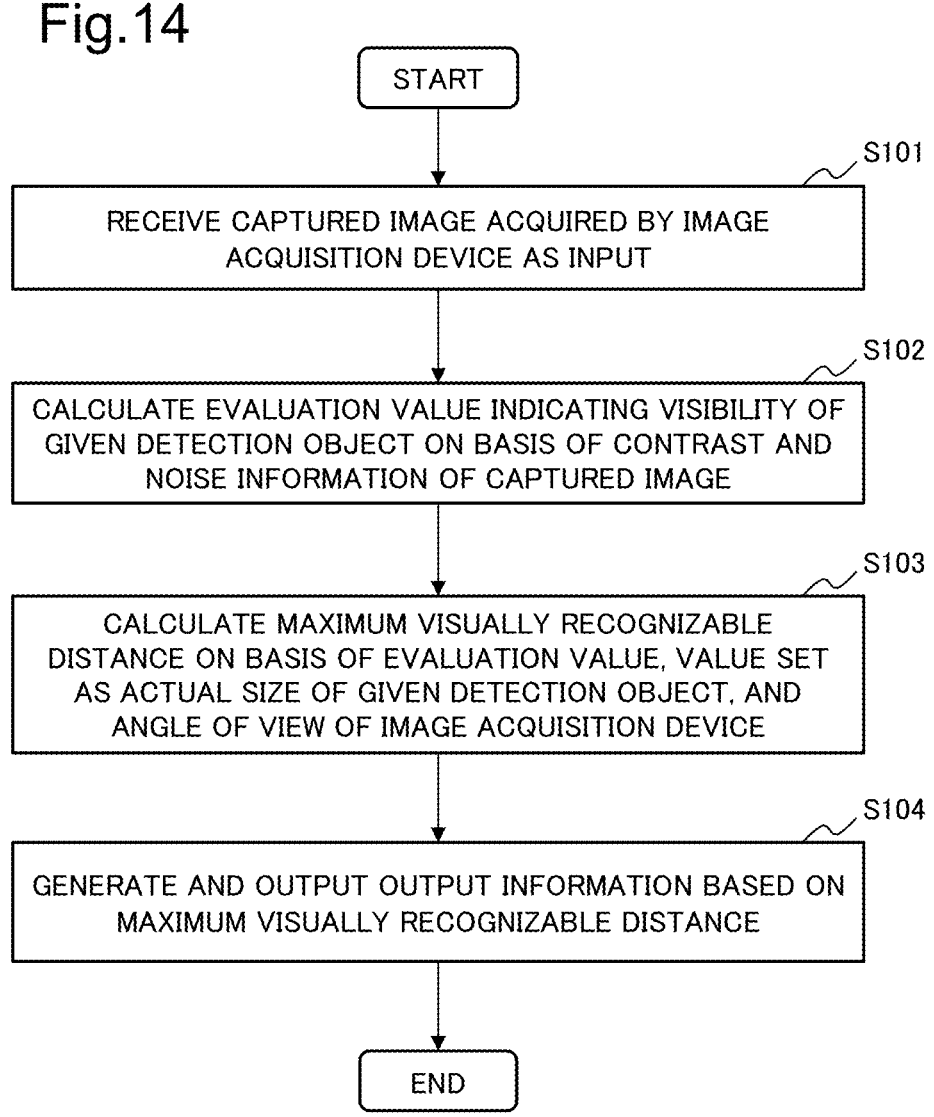
FIG. 14 is a flowchart illustrating a flow of an information processing method according to an example embodiment of the present disclosure.

FIG. 14 is a flowchart illustrating a flow of processing of an information processing method by the calculation device 10. First, the image input unit 101 receives the captured image acquired by the image acquisition device as an input (step S101). Next, the visibility evaluation unit 102 calculates the evaluation value indicating the visibility of the given object to be detected in the captured image based on the contrast of the captured image and the noise information indicating the degree of noise included in the captured image (step S102). Next, the calculation unit 103 calculates the maximum visually recognizable distance based on the evaluation value calculated by the visibility evaluation unit 102, the value set as a real size of the given object to be detected in the captured image, and the angle of view of the image acquisition device (step S103). Then, the output unit 104 outputs the output information based on the calculated maximum visually recognizable distance calculated by the calculation unit 103 and output the output information (step S104).

According to the calculation device 10, a capture range of a monitoring camera and in which the given object to be detected is visually recognizable can be easily and accurately known. This is because the evaluation value representing the visibility is calculated from the contrast and the noise information, and the maximum visually recognizable distance is calculated based on the evaluation value. The evaluation value and the maximum visually recognizable distance are more accurately calculated by using the contrast and the noise information. Since a user does not need to input information such as the evaluation value, the burden on the user is small.

<Hardware Configuration that Implements Each Part of Example Embodiment>

In each of the example embodiments of the present disclosure, the blocks representing the components of the devices are illustrated in functional units. However, the blocks representing the components do not necessarily mean that the components are configured by separate modules.

The processing of the components may be implemented in such a way that a computer system reads and executes a program for causing the computer system to execute the processing stored in a computer-readable storage medium. The "computer readable storage medium" is, for example, a portable medium such as an optical disk, a magnetic disk, a magneto-optical disk, or a nonvolatile semiconductor memory, and a storage device such as a read only memory (ROM) and a hard disk built in the computer system. The "computer readable storage medium" includes a volatile memory in the computer system that can temporarily hold a program, and a communication line such as a network or a telephone line that transmits the program. Further, the program may be a program for implementing a part of the above-described functions and may be further implemented by a combination of the above-described functions with the program stored in the computer system.

Figure 15:
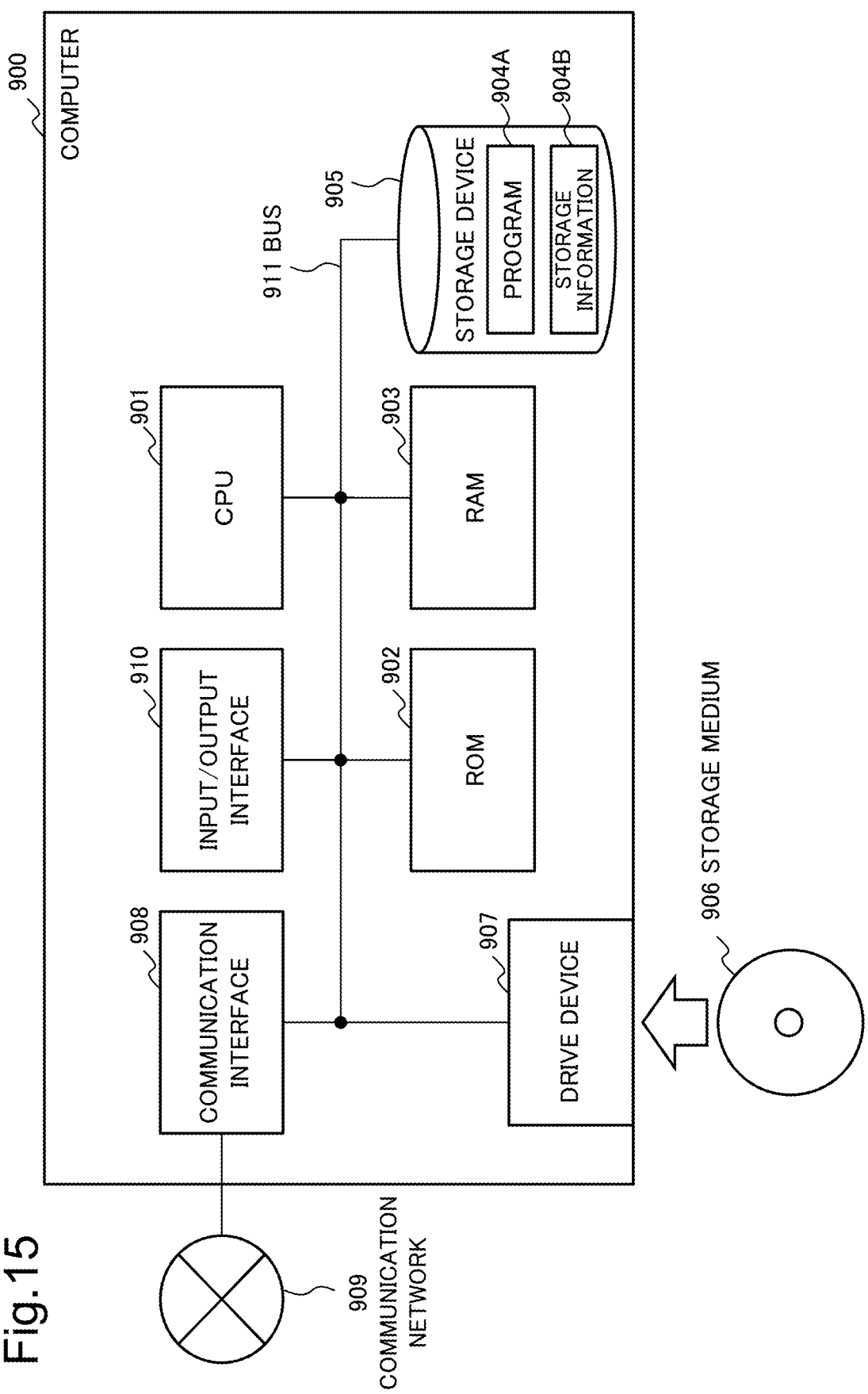
FIG. 15 is a block diagram illustrating an example of hardware that can constitute each part of each example embodiment of the present disclosure.

The "computer system" is, as an example, a system including a computer 900 as illustrated in FIG. 15. The computer 900 includes the following configurations:
- one or a plurality of central processing units (CPUs) 901;
- a ROM 902;
- a random access memory (RAM) 903;
- a program 904A and storage information 904B loaded to the RAM 903;
- a storage device 905 that stores the program 904A and the storage information 904B;
- a drive device 907 that reads and writes a storage medium 906;
- a communication interface 908 connected to a communication network 909;
- an input/output interface 910 that inputs or outputs data; and
- a bus 911 connecting the components.

For example, each component of each device in each example embodiment is implemented by the CPU 901 loading the program 904A for implementing the function of the component into the RAM 903 and executing the program 904A. The program 904A for implementing the function of each component of each device is stored in advance, for example, in the storage device 905 or the ROM 902. Then, the CPU 901 reads the program 904A as necessary. The storage device 905 is, for example, a hard disk. The program 904A may be supplied via the communication network 909 to the CPU 901, or may be stored in advance in the storage medium 906, read by the drive device 907, and supplied to the CPU 901. The storage medium 906 is, for example, a portable medium such as an optical disk, a magnetic disk, a magneto-optical disk, or a nonvolatile semiconductor memory.

There are various modifications to the implementation method of each device. For example, each device may be implemented by a possible combination of the separate computer 900 and a program for each component. Furthermore, a plurality of components of each device may be implemented by a possible combination of one computer 900 and a program.

Furthermore, some or all of the components of each device may be implemented by other general purpose or dedicated circuits, computers, or combinations thereof. These elements may be configured by a single chip or a plurality of chips connected via a bus.

In a case where some or all of the components of each device are implemented by a plurality of computers, circuits, and the like, the plurality of computers, circuits, and the like may be centrally arranged or distributed. For example, the computer, circuits, and the like may be implemented as a client and server system, a cloud computing system, or the like, in which the information processing devices, circuits, and the like are connected via a communication network.

Some or all of the above example embodiments can be described as but are not limited to supplementary notes below.

<<Supplementary Note>>

[Supplementary Note 1]

A calculation device including:

an image input unit that receives, as an input, a captured image acquired by an image acquisition device that captures a predetermined area;

a visibility evaluation unit that calculates an evaluation value representing visibility of a given object to be detected in the captured image based on a contrast of the captured image and noise information indicating a degree of noise included in the captured image;

a calculation unit that calculates a maximum visually recognizable distance in which the given object to be detected is visually recognized in the captured image, the maximum visually recognizable distance being an upper limit of a distance from the image acquisition device to the given object to be detected, based on the evaluation value, a value set as an actual size of the given object to be detected in the captured image, and an angle of view of the image acquisition device; and an output unit that generates output information based on the maximum visually recognizable distance, and outputting the output information

[Supplementary Note 2]

The calculation device according to supplementary note 1, in which the visibility evaluation unit calculates, as the evaluation value, a minimum value of a visually recognizable size of the given object to be detected in the captured image based on the contrast and the noise information.

[Supplementary Note 3]

The calculation device according to supplementary note 1 or 2, further including:

a range calculation unit that calculates a visually recognizable range that is a range in which the given object to be detected is visually recognized in the captured image, of the predetermined area, based on the maximum visually recognizable distance, an installation position of the image acquisition device, the angle of view of the image acquisition device, and three-dimensional shape information including the predetermined area, in which the output unit generates a superimposed image in which information indicating the visually recognizable range is superimposed on a projection view of a real space including at least a part of visually recognizable range, and outputs the superimposed image as the output information.

[Supplementary Note 4]

The calculation device according to supplementary note 3, in which the projection view is the captured image, and the information indicating the visually recognizable range indicates a figure of a shape of an area in which a structure included in a capture range of the image acquisition device and the visually recognizable range overlap with each other.

[Supplementary Note 5]

The calculation device according to supplementary note 3, in which an input for specifying a distance of the given object to be detected from a ground is received, and the output unit generates, as the superimposed image, a superimposed top-view image in which an area where a surface away from the ground by the specified distance and the visually recognizable range overlap with each other is superimposed on a top view of the real space including at least a part of the visually recognizable range based on the input.

[Supplementary Note 6]

The calculation device according to any one of supplementary notes 1 to 5, further including:

an instruction unit that sends an instruction for changing at least either an pose or an angle of view of the image acquisition device to the image acquisition device, in which the calculation unit calculates the maximum visually recognizable distance again in response to the change of the angle of view of the image acquisition device, and the output unit generates second output information based on the re-calculated maximum visually recognizable distance and outputs the second output information.

[Supplementary Note 7]

An information processing method including:

receiving, as an input, a captured image acquired by an image acquisition device that captures a predetermined area;

calculating an evaluation value representing visibility of a given object to be detected in the captured image based on a contrast of the captured image and noise information indicating a degree of noise included in the captured image;

calculating a maximum visually recognizable distance in which the given object to be detected is visually recognized in the captured image, the maximum visually recognizable distance being an upper limit of distance from the image acquisition device to the given object to be detected, based on the evaluation value, a value set as an actual size of the given object to be detected in the captured image, and an angle of view of the image acquisition device; and generating output information based on the maximum visually recognizable distance, and outputting the output information.

[Supplementary Note 8]

The information processing method according to supplementary note 7, in which a minimum value of a visually recognizable size of the given object to be detected in the captured image is calculated based on the contrast and the noise information as the evaluation value.

[Supplementary Note 9]

The information processing method according to supplementary note 7 or 8, further including:

calculating a visually recognizable range that is a range in which the given object to be detected is visually recognized in the captured image, of the predetermined area, based on the maximum visually recognizable distance, an installation position of the image acquisition device, the angle of view of the image acquisition device, and three-dimensional shape information including the predetermined area; and generating a superimposed image in which information indicating the visually recognizable range is superimposed on a projection view of a real space including at least a part of the visually recognizable range, and outputting the superimposed image as the output information.

[Supplementary Note 10]

The information processing method according to supplementary note 9, in which the projection view is the captured image, and the information indicating the visually recognizable range indicates a figure of a shape of an area in which a structure included in a capture range of the image acquisition device and the visually recognizable range overlap with each other.

[Supplementary Note 11]

The information processing method according to supplementary note 9, further including:

receiving an input for specifying a distance of the given object to be detected from a ground; and generating, as the superimposed image, a superimposed top-view image in which an area where a surface away from the ground by the specified distance and the visually recognizable range overlap with each other is superimposed on a top view of the real space including at least a part of the visually recognizable range based on the input.

[Supplementary Note 12]

The information processing method according to any one of supplementary notes 7 to 11, further including:

sending an instruction for changing at least either an pose or an angle of view of the image acquisition device to the image acquisition device; and calculating the maximum visually recognizable distance again in response to the change of the angle of view of the image acquisition device, and generating second output information based on the re-calculated maximum visually recognizable distance and outputting the second output information.

[Supplementary Note 13]

A computer-readable storage medium storing a program for causing a computer to execute:

image input processing for receiving, as an input, a captured image acquired by an image acquisition device that captures a predetermined area;

visibility evaluation processing for calculating an evaluation value representing visibility of a given object to be detected in the captured image based on a contrast of the captured image and noise information indicating a degree of noise included in the captured image;

calculation processing for calculating a maximum visually recognizable distance in which the given object to be detected is visually recognized in the captured image, the maximum visually recognizable distance being an upper limit of distance from the image acquisition device to the given object to be detected, based on the evaluation value, a value set as an actual size of the given object to be detected in the captured image, and an angle of view of the image acquisition device; and output processing for generating output information based on the maximum visually recognizable distance, and outputting the output information.

[Supplementary Note 14]

The storage medium according to supplementary note 13, in which the visibility evaluation processing calculates, as the evaluation value, a minimum value of a visually recognizable size of the given object to be detected in the captured image based on the contrast and the noise information.

[Supplementary Note 15]

The storage medium according to supplementary note 13 or 14, storing the program for causing the computer to further execute:

range calculation processing for calculating a visually recognizable range that is a range in which the given object to be detected is visually recognized in the captured image, of the predetermined area, based on the maximum visually recognizable distance, an installation position of the image acquisition device, the angle of view of the image acquisition device, and three-dimensional shape information including the predetermined area, in which the output processing generates a superimposed image in which information indicating the visually recognizable range is superimposed on a projection view of a real space including at least a part of the visually recognizable range, and outputs the superimposed image as the output information.

[Supplementary Note 16]

The storage medium according to supplementary note 15, in which the projection view is the captured image, and the information indicating the visually recognizable range indicates a figure of a shape of an area in which a structure included in a capture range of the image acquisition device and the visually recognizable range overlap with each other.

[Supplementary Note 17]

The storage medium according to supplementary note 15, storing the program for causing the computer to receive an input for specifying a distance of the given object to be detected from a ground, in which the output processing generates, as the superimposed image, a superimposed top-view image in which an area where a surface away from the ground by the specified distance and the visually recognizable range overlap with each other is superimposed on a top view of the real space including at least a part of the visually recognizable range based on the input.

[Supplementary Note 18]

The storage medium according to any one of supplementary notes 13 to 17, storing the program for causing the computer to further execute:

instruction processing for sending an instruction for changing at least either an pose or an angle of view of the image acquisition device to the image acquisition device, in which the calculation processing calculates the maximum visually recognizable distance again in response to the change of the angle of view of the image acquisition device, and the output processing generates second output information based on the re-calculated maximum visually recognizable distance and outputs the second output information.

The present invention is not limited to the above-described example embodiments. It will be understood by those of ordinary skill in the art that various changes in form and details may be made therein without departing from the spirit and scope of the present invention in the above-described configurations and details of the example embodiments.

REFERENCE SIGNS LIST 10, 11, and 12 calculation device
20 camera
101 image input unit 102 visibility evaluation unit
103 calculation unit
104 output unit
110 storage unit
111 image acquisition unit
112 visibility evaluation unit
1121 contrast value calculation unit
1122 noise amount specifying unit
1123 evaluation value calculation unit
113 distance calculation unit
119 output unit
124 range specifying unit
900 computer
901 CPU
902 ROM
903 RAM
904A program
904B storage information
905 storage device
906 storage medium
907 drive device
908 communication interface
909 communication network
910 input/output interface
911 bus

What is claimed is:

1. A calculation device comprising:
a memory; and at least one processor coupled to the memory, the at least one processor performing operations to: receive, as an input, a captured image acquired by an image acquisition device that captures a predetermined area; calculate an evaluation value representing visibility of a given object to be detected in the captured image based on a contrast of the captured image and noise information indicating a degree of noise included in the captured image; calculate a maximum visually recognizable distance in which the given object to be detected is visually recognized in the captured image, the maximum visually recognizable distance being an upper limit of a distance from the image acquisition device to the given object to be detected, based on the evaluation value, a value set as an actual size of the given object to be detected in the captured image, and an angle of view of the image acquisition device;
and generate output information based on the calculated maximum visually recognizable distance, and outputting the output information.

2. The calculation device according to claim 1, wherein the at least one processor further performs operation to:
calculate, as the evaluation value, a minimum value of a visually recognizable size of the given object to be detected in the captured image based on the contrast and the noise information.

3. The calculation device according to claim 1, wherein the at least one processor further performs operation to:
calculate a visually recognizable range that is a range in which the given object to be detected is visually recognized in the captured image, of the predetermined area, based on the maximum visually recognizable distance, an installation position of the image acquisition device, the angle of view of the image acquisition device, and three-dimensional shape information including the predetermined area; and,
generate a superimposed image in which information indicating the visually recognizable range is superimposed on a projection view of a real space including at least a part of the visually recognizable range, and output the superimposed image as the output information.

4. The calculation device according to claim 3, wherein the projection view is the captured image, and the information indicating the visually recognizable range indicates a figure of a shape of an area in which a structure included in a capture range of the image acquisition device and the visually recognizable range overlap with each other.

5. The calculation device according to claim 3, wherein the at least one processor further performs operation to:
receive an input for specifying a distance of the given object to be detected from a ground; and
generate, as the superimposed image, a superimposed top-view image in which an area where a surface away from the ground by the specified distance and the visually recognizable range overlap with each other is superimposed on a top view of the real space including at least a part of the visually recognizable range based on the input.

6. The calculation device according to claim 1, wherein the at least one processor further performs operation to:
send an instruction for changing at least either an pose or an angle of view of the image acquisition device to the image acquisition device;
calculate the maximum visually recognizable distance again in response to the change of the angle of view of the image acquisition device; and
generate second output information based on the re-calculated maximum visually recognizable distance and outputs the second output information.

7. An information processing method comprising:
by at least one processor,
receiving, as an input, a captured image acquired by an image acquisition device that captures a predetermined area;
calculating an evaluation value representing visibility of a given object to be detected in the captured image based on a contrast of the captured image and noise information indicating a degree of noise included in the captured image;
calculating a maximum visually recognizable distance in which the given object to be detected is visually recognized in the captured image, the maximum visually recognizable distance being an upper limit of distance from the image acquisition device to the given object to be detected, based on the evaluation value, a value set as an actual size of the given object to be detected in the captured image, and an angle of view of the image acquisition device; and
generating output information based on the maximum visually recognizable distance, and outputting the output information.

8. The information processing method according to claim 7, wherein
a minimum value of a visually recognizable size of the given object to be detected in the captured image is calculated based on the contrast and the noise information as the evaluation value.

9. The information processing method according to claim 7, further comprising:
by at least one processor,
calculating a visually recognizable range that is a range in which the given object to be detected is visually recognized in the captured image, of the predetermined area, based on the maximum visually recognizable distance, an installation position of the image acquisition device, the angle of view of the image acquisition device, and three-dimensional shape information including the predetermined area; and generating a superimposed image in which information indicating the visually recognizable range is superimposed on a projection view of a real space including at least a part of the visually recognizable range, and outputting the superimposed image as the output information.

10. The information processing method according to claim 9, wherein the projection view is the captured image, and the information indicating the visually recognizable range indicates a figure of a shape of an area in which a structure included in a capture range of the image acquisition device and the visually recognizable range overlap with each other.

11. The information processing method according to claim 9, further comprising:

by at least one processor, receiving an input for specifying a distance of the given object to be detected from a ground; and generating, as the superimposed image, a superimposed top-view image in which an area where a surface away from the ground by the specified distance and the visually recognizable range overlap with each other is superimposed on a top view of the real space including at least a part of the visually recognizable range based on the input.

12. The information processing method according to claim 7, further comprising:

by at least one processor, sending an instruction for changing at least either an pose or an angle of view of the image acquisition device to the image acquisition device;

calculating the maximum visually recognizable distance again in response to the change of the angle of view of the image acquisition device; and generating second output information based on the re-calculated maximum visually recognizable distance and outputting the second output information.

13. A non-transitory computer-readable storage medium storing a program for causing a computer to execute:

receiving, as an input, a captured image acquired by an image acquisition device that captures a predetermined area; visibility evaluation processing for calculating an evaluation value representing visibility of a given object to be detected in the captured image based on a contrast of the captured image and noise information indicating a degree of noise included in the captured image; calculating a maximum visually recognizable distance in which the given object to be detected is visually recognized in the captured image, the maximum visually recognizable distance being an upper limit of distance from the image acquisition device to the given object to be detected, based on the evaluation value, a value set as an actual size of the given object to be detected in the captured image, and an angle of view of the image acquisition device;

and generating output information based on the calculated maximum visually recognizable distance, and outputting the output information.

14. The non-transitory storage medium according to claim 13, wherein the operations further comprise:

calculating, as the evaluation value, a minimum value of a visually recognizable size of the given object to be detected in the captured image based on the contrast and the noise information.

15. The non-transitory wherein medium according to claim 13, wherein the operations further comprise:

calculating a visually recognizable range that is a range in which the given object to be detected is visually recognized in the captured image, of the predetermined area, based on the maximum visually recognizable distance, an installation position of the image acquisition device, the angle of view of the image acquisition device, and three-dimensional shape information including the predetermined area; and generating a superimposed image in which information indicating the visually recognizable range is superimposed on a projection view of a real space including at least a part of the visually recognizable range, and outputs the superimposed image as the output information.

16. The non-transitory storage medium according to claim 15, wherein the projection view is the captured image, and the information indicating the visually recognizable range indicates a figure of a shape of an area in which a structure included in a capture range of the image acquisition device and the visually recognizable range overlap with each other.

17. The non-transitory storage medium according to claim 15, wherein the operations further comprise:

receiving an input for specifying a distance of the given object to be detected from a ground; and generating, as the superimposed image, a superimposed top-view image in which an area where a surface away from the ground by the specified distance and the visually recognizable range overlap with each other is superimposed on a top view of the real space including at least a part of the visually recognizable range based on the input.

18. The non-transitory storage medium according to claim 13, wherein the operations further comprise:

sending an instruction for changing at least either an pose or an angle of view of the image acquisition device to the image acquisition device;

calculating the maximum visually recognizable distance again in response to the change of the angle of view of the image acquisition device; and generating second output information based on the re-calculated maximum visually recognizable distance and outputs the second output information.

* * * * *